(12) United States Patent
Won et al.

(10) Patent No.: US 8,199,665 B2
(45) Date of Patent: Jun. 12, 2012

(54) APPARATUS AND METHOD FOR SCHEDULING SERVICE BASED ON NETWORK DELAY

(75) Inventors: Jeong-Jae Won, Hwaseong-si (KR); Dae-Joong Kim, Yeongin-si (KR); Byung-suk Kim, Uiwang-si (KR); Jae-Seong Han, Seoul (KR); Sang-Heon Lee, Seoul (KR); Dong-Seop Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 248 days.

(21) Appl. No.: 12/627,495

(22) Filed: Nov. 30, 2009

(65) Prior Publication Data

US 2011/0128856 A1    Jun. 2, 2011

(51) Int. Cl.
*H04L 1/00* (2006.01)
*H04L 12/26* (2006.01)

(52) U.S. Cl. ......................................... 370/252; 370/237
(58) Field of Classification Search .................... None
See application file for complete search history.

(56) References Cited

U.S. PATENT DOCUMENTS

2009/0175241 A1\* 7/2009 Ohta et al. ..................... 370/331
\* cited by examiner

*Primary Examiner* — Clemence Han
(74) *Attorney, Agent, or Firm* — Jefferson IP Law, LLP

(57) ABSTRACT

An apparatus and method for determining a network delay and scheduling a service based on the delay are provided. The method includes determining information about a first time at which data is transmitted, determining information about a second time at which the data is received, determining a time delay using the first time and the second time, and scheduling a service based on the time delay. Because scheduling of service is based on a determined time delay, radio resources are more efficiently used.

24 Claims, 4 Drawing Sheets

(CONVENTION ART)

(CONVENTION ART)

APPARATUS AND METHOD FOR SCHEDULING SERVICE BASED ON NETWORK DELAY

BACKGROUND OF THE INVENTION

1. Field of the Invention

The present invention relates to the scheduling of service in a mobile communication system. More particularly, the present invention relates to the scheduling of service based on a delay in a network.

2. Description of the Related Art

Voice communication between users of mobile communication terminals has been provided for many years by various service providers. As use of mobile communication terminals has become more widespread, mobile communication terminal users now desire advanced services such as email, Internet access, video streaming, real time gaming, and the like. One technology that is under development to provide such advanced services is the 3$^{rd}$ Generation Partnership Project (3GPP) Long Term Evolution (LTE) system. A goal of the LTE system is to provide advanced services with a download speed of 100 Mbps.

To provide such advanced services at high speed, the LTE system associates a Quality of Service (QoS) parameter with a service provided to a user. For example, the LTE system may assign a first QoS to a mobile communication terminal that is participating in a voice communication and assign a second, higher QoS to a mobile communication terminal that is receiving a streaming video. The LTE system makes scheduling decisions based on the QoS assigned to each mobile communication terminal.

FIG. 1 illustrates components of an LTE system providing a service to a user according to the conventional art.

Referring to FIG. 1, an LTE system includes a Packet data network GateWay (PGW) 110, a Serving GateWay (SGW) 120, an evolved Node B (eNB) 130 and a User Equipment (UE) 140. The PGW 110 and the SGW 120 are located together at a Mobility Management Entity/GateWay (MME/GW, not shown) that is located remotely from the eNB 130. The PGW 110 provides an interface between the MME/GW and a Packet Data Network (PDN) (e.g., the Internet, not shown) and the SGW 120 provides an interface between the MME/GW and one or more eNBs (e.g., eNB 130) served by the MME/GW. Between the PGW 110 and the SGW 120, a Core Network (CN) 150 is provided for transmitting and receiving information between the PGW 110 and the SGW 120. Between the SGW 120 and the eNB 130, a Backhaul Network (BN) 160 is provided for transmitting and receiving information between the SGW 120 and the eNB 130. The Backhaul Network 160 typically comprises an S1 connection. Finally, the eNB 130 provides a wireless service to the UE 140.

When a packet-based service, such as a data service, is provided to the UE 140 in the LTE system, a Packet Delay Budget (PDB) is associated with the UE 140 depending on the QoS of the service. More specifically and with reference to Table 1, each Service Data Flow (SDF) that may be provided to the UE 140 is assigned a QoS class Identifier (QCI) and each QCI has a corresponding PDB. The PDB is an allowed delay time between the PGW 110 and the UE 140 and defines an upper bound of time-delay that a packet can experience between the PGW 110 and the UE 140. The QCIs, and PDBs associated with each QCI, are defined in 3GPP Technical Specification 23.203, the entire disclosure of which is hereby incorporated by reference. In Table 1, PELR indicates Packet Error Loss Rate, and GBR indicates Guaranteed Bit Rate.

TABLE 1

| QCI | Resource Type | Priority | PDB | PELR | Example Service |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 4 | 300 ms | $10^{-6}$ | Non-Conversational Video (Buffered Streaming) |
| 5 | Non-GBR | 1 | 100 ms | $10^{-6}$ | IMS Signaling |
| 6 | | 6 | 30 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) |
| 9 | | 9 | | | TCP-based (e.g., www, e-mail, chat, ftp, p2p file sharing, progressive video, etc.) |

In the LTE system of FIG. 1, the eNB 130 schedules a service to the UE 140 as well as other UEs supported by the eNB. To schedule the services to the UEs, the eNB 130 uses an algorithm to determine a QoS scheduling metric for each SDF provided to respective UEs. The scheduling metric is defined in Equation (1).

$$S_k(t) = C\left(\frac{R_k(t)}{AvgR_k(t)}\right)\left(\frac{D_k(t)}{T_k}\right) + O(P_k) \qquad \text{Eq. (1)}$$

In Equation (1), t is a subframe number, $S_k(t)$ is the QoS scheduling metric for each SDF at subframe t, C is a constant, $R_k(t)$ is a channel capacity at t, Avg $R_k(t)$ is an average channel capacity at t, $D_k(t)$ is a packet delay for a non-Guaranteed Bit Rate (non-GBR) service at t or a token delay for a GBR service at t, $T_k$ is the PDB of service k and $O(P_k)$ is an offset according to the priority of service k. Accordingly, the result $S_k(t)$ of the scheduling metric is dependent on the value of $T_k$, wherein $T_k$ is the PDB corresponding to the service provided to the UE.

After determining $S_k(t)$ for the UEs served by the eNB, the eNB selects the largest scheduling metric for radio resource allocation per subframe. The selection is made according to Equation (2).

$$K = \arg\max S_k(t) \qquad \text{Eq. (2)}$$

In the above described LTE system, scheduling is determined by the eNB using Equations (1) and (2) which are dependent on the PDB associated with the service provided to the UE. In this case, the scheduling metric does not consider actual delays between the PGW and the UE.

FIG. 2 illustrates components of an LTE system and their associated delays according to the conventional art.

Referring to FIG. 2, packet data, related to a service that is provided to the UE 140, is received at the PGW 110 and transmitted to the UE 140 through the Core Network 150, the SGW 120, the Backhaul Network 160 and the eNB 130. While there are several sources of delay in the packet data stream, two delays of concern are the Core Network delay (CN delay) 210 and the Backhaul Network delay (BN delay) 220. The CN delay and BN delay are cumulatively referred to as the CB delay.

During operation of the LTE system, the CB delay varies depending on data traffic and other conditions of the system. Typically, the CB delay is considered to have a value between 10 ms and 50 ms, depending on system parameters such as proximity of the eNB to the MME/GW. However, an actual CB delay is not considered by the eNB when performing the scheduling of services. That is, by using Equation (1), the scheduler of the eNB 140 only considers the assigned PDB (i.e., $T_k$) associated with the SDF as listed in Table 1 when determining $S_k(t)$.

In the above LTE system, a situation may occur in which, given close proximity of the eNB to the MME/GW, light data traffic, or other such conditions, the CB delay may be small. However, because the actual CB delay is not considered when determining the scheduling metric, the eNB may erroneously determine that service cannot be provided to a UE since scheduling is determined based on the assigned PDB. In this situation, channel utilization will not be maximized because available resources will not be used to provide the desired SDF to the UE.

Therefore, a need exists for an improved apparatus and method for determining transmission delay in a mobile communication system and scheduling service based on the determined delay.

SUMMARY OF THE INVENTION

An aspect of the present invention is to address at least the above-mentioned problems and/or disadvantages and to provide at least the advantages described below. Accordingly, an aspect of the present invention is to provide an apparatus and method for determining a transmission delay in a mobile communication system.

Yet another aspect of the present invention is to provide an apparatus and method for determining a transmission delay in a mobile communication system and scheduling a service based on the determined delay.

Another aspect of the present invention is to provide an apparatus and method for determining time synchronization information.

Still another aspect of the present invention is to provide an apparatus and method for transmitting time synchronization information.

According to an aspect of the present invention, a method for determining a network delay in a base station of a mobile communication system is provided. The method includes determining information about a first time at which data is transmitted, determining information about a second time at which the data is received, determining a time delay using the first time and the second time, and scheduling a service based on the time delay.

According to another aspect of the present invention, an apparatus at a base station for scheduling a service based on a network delay is provided. The apparatus includes a time synchronization controller for determining information about a first time at which data is transmitted, and for determining information about a second time at which the data is received, and a scheduler for determining a time delay using the first time and the second time, and for scheduling a service based on the time delay.

According to still another aspect of the present invention, a mobile communication system for scheduling a service is provided. The system includes a server for determining information about a first time at which data is transmitted, and a base station for determining information about a second time at which the data is received, for determining a time delay using the first time and the second time, and for scheduling a service based on the time delay.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description of exemplary embodiments of the present invention is made with reference to a Long Term Evolution (LTE) system. However, it is to be understood that this is merely for sake of convenience and is not to be construed as limiting. Accordingly, it should be understood by one skilled in the art that the present invention, as defined by the claims and their equivalents, may be equally applied to other communication systems.

Figure 1:
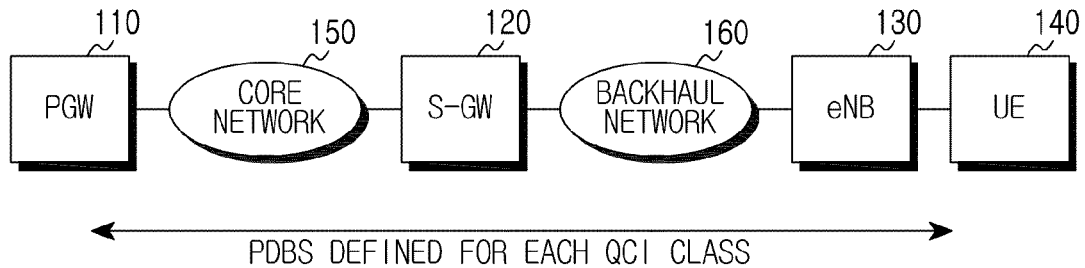
FIG. 1 illustrates components of an Long Term Evolution (LTE) system providing a service to a user according to the conventional art.
Figure 2:
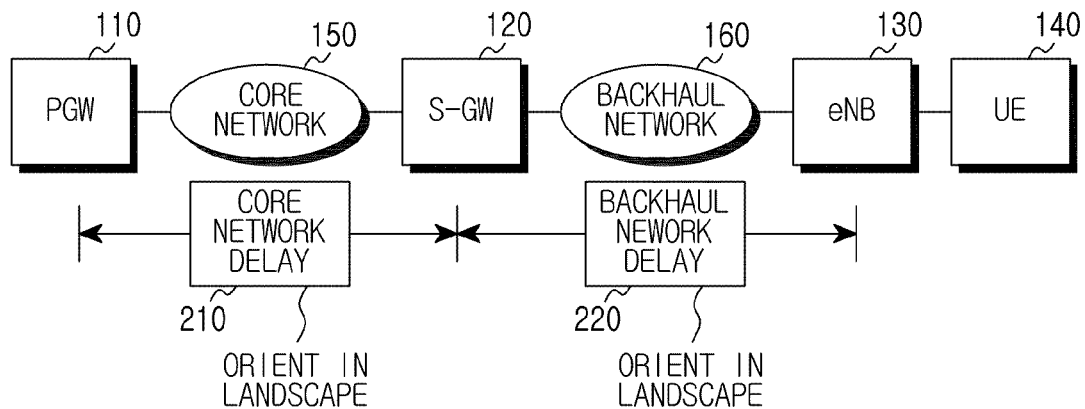
FIG. 2 illustrates components of an LTE system and their associated delays according to the conventional art.
Figure 3:
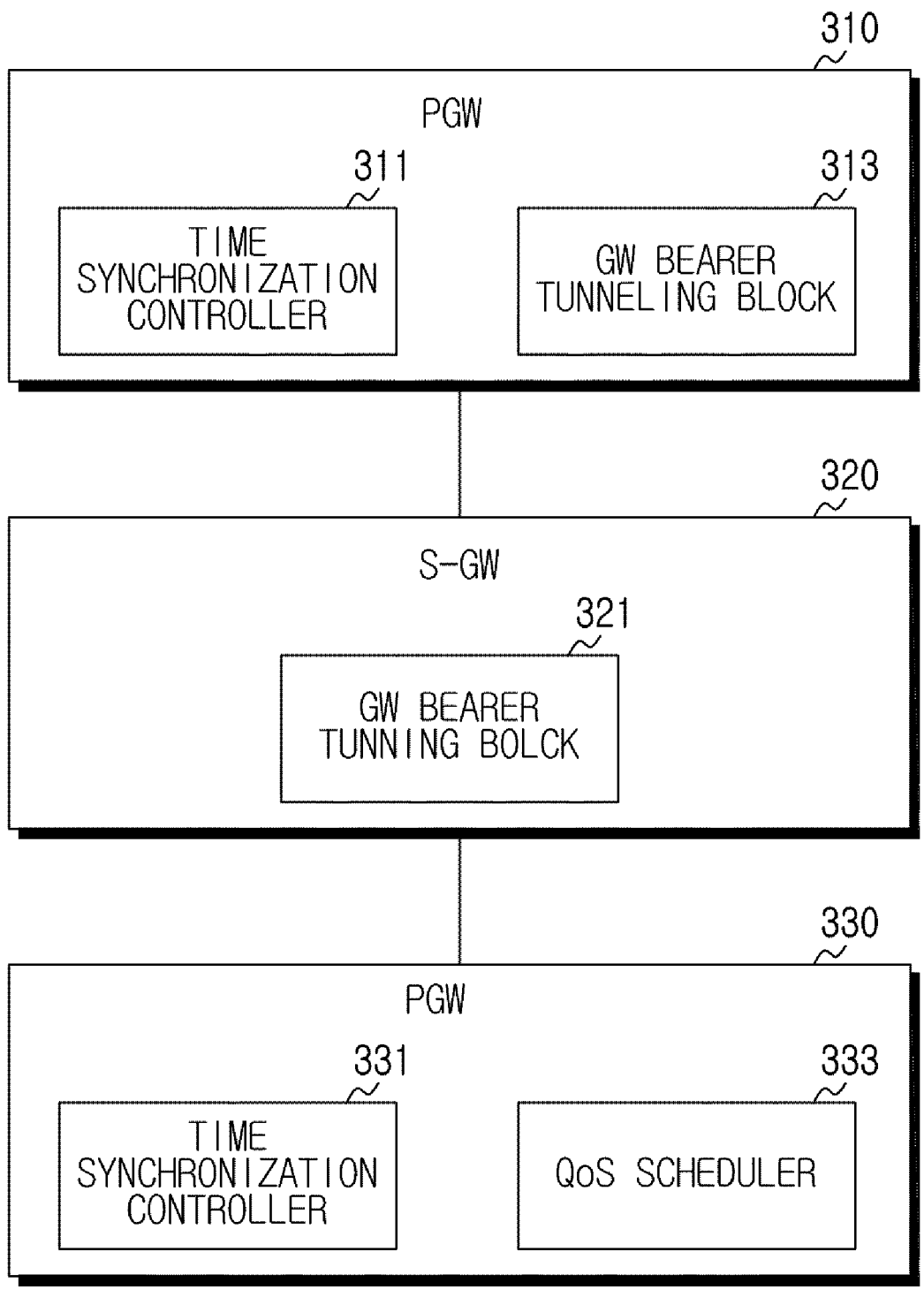
FIG. 3 illustrates components of an LTE system for determining a transmission delay according to an exemplary embodiment of the present invention.

FIG. 3 illustrates components of an LTE system for determining a transmission delay according to an exemplary embodiment of the present invention.

Referring to FIG. 3, the LTE system includes a Packet data network GateWay (PGW) 310, a serving GateWay 320 and an evolved Node B (eNB) 330. The PGW 310 and SGW 320 are located at a Mobility Management Entity/GateWay (MME/GW) (not shown). The PGW 310 provides an interface between the MME/GW and a packet data network (e.g., the Internet) and the SGW 320 provides an interface between the MME/GW and the eNB 330. The PGW 310 further includes a Time Synchronization Controller 311 and a GateWay (GW) Bearer Tunneling Block 313.

When the PGW 310 receives a request to provide a packet based service to the eNB 330, for example a data service, the Time Synchronization Controller 311 of the PGW 310 determines synchronized time information that will be used to determine a network delay. That is, the synchronized time information will be used by both a transmitting end (e.g., the PGW 310) and a receiving end (e.g., the eNB 330) to ensure proper determination of the network delay. A more detailed explanation of determining synchronized time information will be provided below.

The following is an explanation of various exemplary methods for providing time synchronization information between nodes in a network, for example time synchronization information between a PGW node and an eNB node of an LTE network. Providing time synchronization information between nodes is important to ensure accurate determination of a network time delay.

In a first exemplary embodiment, time synchronization is based on a Global Positioning System. In a second exemplary embodiment, time synchronization is based on a Network Time Protocol (NTP) or a Precision Timing Protocol (PTP) as defined by the Institute of Electrical and Electronics Engineers (IEEE) 1588 standard, the entire disclosure of which is hereby incorporated by reference. And in a third exemplary embodiment, time synchronization is based on self-made time synchronization between nodes. In each of the exemplary embodiments, a Time Synchronization Controller at each node considers time stamp information to ensure proper determination of a network time delay.

Time Synchronization Based on GPS

In determining time synchronization information based on GPS, a local clock at a node that is internally or externally coupled to a GPS receiver is updated according to Time of Day (ToD) information received from the GPS at every second or at every two seconds. Referring to FIG. 3 as an example, a local clock at the Time Synchronization Controller 311 of the PGW 310 (or at the Time Synchronization Controller 331 of the eNB 330) may be internally or externally coupled to a GPS receiver. Through this coupling, the local clock receives the ToD information from the GPS. Based on the received time information, the Time Synchronization Controller records a transmitting time (for example, in the case of the PGW transmitting packet data to the eNB) or records a receiving time (for example, in the case of the eNB receiving packet data from the PGW) of packet data transmitted or received. Because the transmitting time and receiving time are based on synchronized time information, they can be used by the eNB QoS Scheduler to accurately determine a network delay as will be discussed below.

If a difficulty occurs in reading the local clock in real time, the absolute time as provide by the GPS may be recorded at every second or every two seconds at which the ToD is received. In either case, the current time of transmission or reception may be determined as "GPS ToD time+(counter value*counter period)" wherein the counter value and counter period are determined and managed by an internal counter (e.g. Central Processing Unit (CPU) cycle counter) of the Time Synchronization Controller or other structure at the PGW, the eNB or other appropriate node.

Time Synchronization Based on Network—NTP or IEEE 1588 Application

In a second exemplary embodiment for providing absolute time, a local clock (e.g., a local clock at the Time Synchronization Controller 311 of the PGW 310 or at the Time Synchronization Controller 331 of the eNB 330) may be updated by receiving time information from a time server of a network. The time information provided by the time server may be received through the network using a method such as an NTP or a PTP as defined in the Institute of Electrical and Electronics Engineers (IEEE) 1588 standard. In such a case, the local clock is updated according to a specific method as provided by the NTP or IEEE 1588 standard.

Similar to the use of the GPS, a local clock records a transmitting time (for example, in the case of the PGW transmitting packet data to the eNB) or records a receiving time (for example, in the case of the eNB receiving packet data from the PGW) as provided by the time server of the network. The transmitting time and receiving time can be used by the eNB QoS Scheduler to accurately determine a network delay as will be discussed below.

Also, similar to the use of the GPS, if difficulty occurs in reading the local clock in real time, a structure (e.g., Time Synchronization Controller) may use an internal counter as described above with reference to use of the GPS. That is, the Time Synchronization Controller may receive and record time information at every second or every two seconds using the NTP or PTP. In this situation, real time may be determined based on a counter managed by an internal or otherwise local device.

Time Synchronization Based on Network—Self-made Time Synchronization Between Nodes When a timing method using a network time server is not available or the necessary accuracy is not confirmed, time synchronization between nodes may be acquired by estimating a relative time offset using a method similar to the above described method using NTP or IEEE 1588 between the nodes through the network. In this situation, time offset is estimated according to the Equation (3).

$$\text{Time Offset} = \text{Remote Time} + RTT/2 - \text{Local Time} \quad \text{Eq. (3)}$$

In Equation (3), Remote Time is a timestamp value provided from the node that transmits packet data, RTT is an estimated Round Trip Time of a round-trip delay between nodes, and Local Time is the time at the node receiving the packet data. In this method, filtering is necessary according to network conditions for estimating Offset and RTT. Time synchronization between nodes is done periodically and a local clock is revised according to an offset value.

Similar to the above two methods, if a structure using the self-made time synchronization has difficulty reading a local clock in real time, an internal counter may be used.

Referring again to FIG. 3, the Time Synchronization Controller 311 provides the synchronized time information to a GateWay (GW) Bearer Tunneling Block 313. The GW Bearer Tunneling Block 313 of the PGW 310 receives the synchronized time information from the Time Synchronization Controller 311 and formats the received synchronized time information for transmission to the SGW 320.

Figure 4:
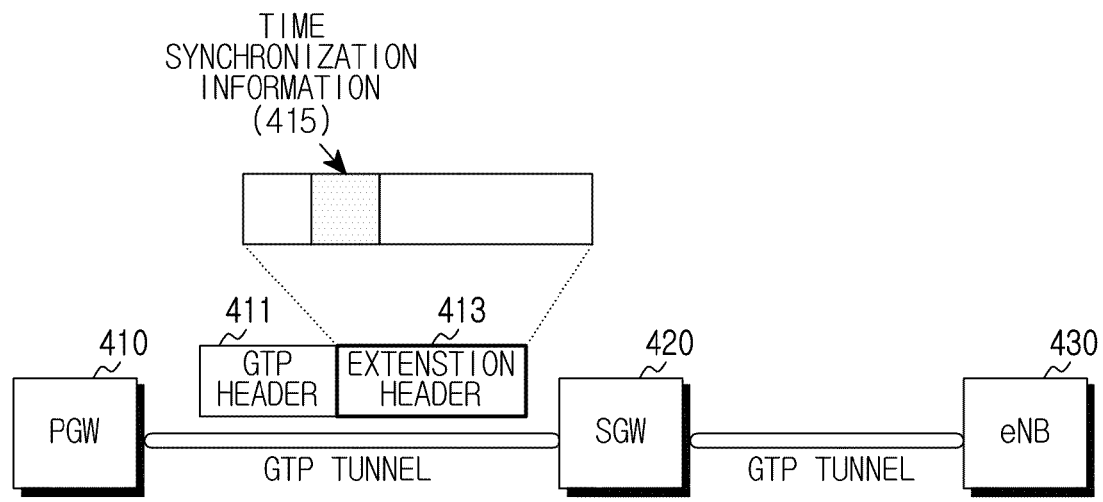
FIG. 4 is a block diagram illustrating the formatting of synchronized time information for transmission by a Packet data network GateWay (PGW) according to an exemplary embodiment of the present invention.

FIG. 4 is a block diagram illustrating the formatting of synchronized time information for transmission by a PGW according to an exemplary embodiment of the present invention.

Referring to FIG. 4, a PGW 410 includes a Time Synchronization Controller (not shown) for determining synchronized time information, and a GW Bearer Tunneling Block (not shown) for receiving and transmitting the synchronized time information received from the Time Synchronization Controller. Upon receipt of the synchronized time information, the GW Bearer Tunneling Block is triggered to format the synchronized time information for transmission to the SGW 420. In an exemplary implementation, the GW Bearer Tunneling Block of the PGW 410 formats the synchronized time information using a General Packet Radio Service (GPRS) Tunneling Protocol (GTP) header 411 and includes the synchronized starting time information therein. More specifically, the GW Bearer Tunneling Block generates a GTP extension header 413 for transmission of the synchronized time information 415 therein.

Furthermore, the GW Bearer Tunneling Block sets a Sequence Number (SN) flag and sets an extension header flag to indicate the presence of the synchronized time information. That is, the GW Bearer Tunneling Block sets the SN flag and extension header flag to 'on.'

Referring again to FIG. 3, the GW Bearer Tunneling Block 313 of the PGW 310 transmits the synchronized time information to the SGW 320. As indicated above, the synchronized time information may be transmitted to the SGW 320 using a GTP extension header. Upon receipt of the synchronized time information from the PGW 310, the SGW 320 prepares the synchronized time information for transmission to the eNB 330.

Figure 5:
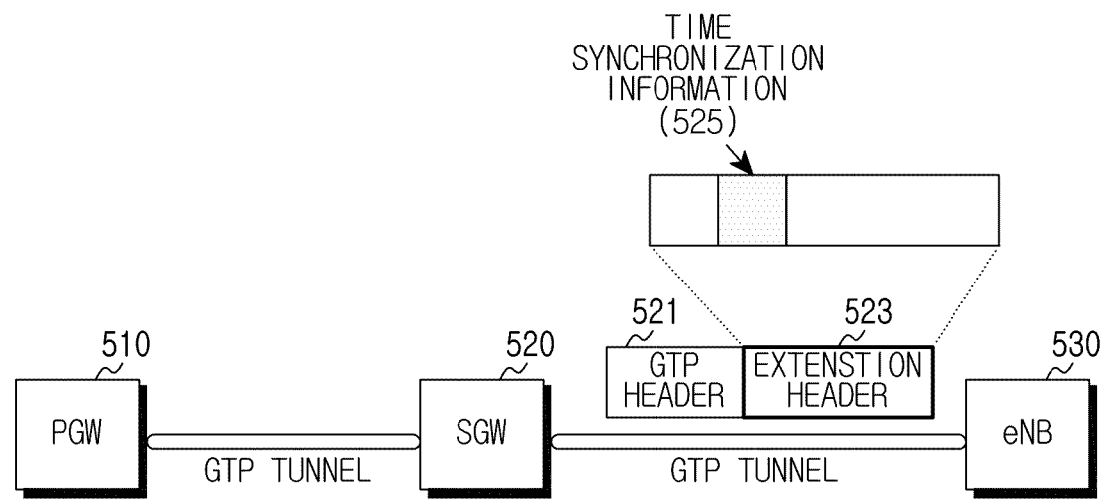
FIG. 5 is a block diagram illustrating the formatting of synchronized time information for transmission by a Serving GateWay (SGW) according to an exemplary embodiment of the present invention.

FIG. 5 is a block diagram illustrating the formatting of synchronized time information for transmission by an SGW according to an exemplary embodiment of the present invention.

Referring to FIG. 5, an SGW 520 includes a GW Bearer Tunneling Block (not shown). The GW Bearer Tunneling Block of the SGW 520 receives synchronized time information from the GW Bearer Tunneling Block of the PGW 510 and transmits the synchronized time information to the eNB 530. More specifically, the GW Bearer Tunneling Block of the SGW 520 receives the synchronized time information from the GW Bearer Tunneling Block of the PGW 510 through a GTP Extension Header transmitted by the GW Bearer Tunneling Block of the PGW 510. After receipt of the synchronized time information, the GW Bearer Tunneling Block of the SGW 520 prepares to transmit the synchronized time information to the eNB 530. For transmission of the synchronized time information, the GW Bearer Tunneling Block of the SGW 520 formats the synchronized time information using a GTP header 521 and includes the synchronized starting time information therein. More specifically, the GW Bearer Tunneling Block of the SGW 530 generates a GTP extension header 523 for transmission of the synchronized time information 525 therein. In an exemplary implementation, the GW Bearer Tunneling Block of the SGW 520 copies the GTP Extension Header received from the GW Bearer Tunneling Block of the PGW 510 and pastes the GTP Extension Header 523 into the GTP Header 521 to be transmitted to the eNB. After the GTP Header 521 including the GTP Extension Header 523 is prepared, the GW Bearer Tunneling Block of the SGW 520 transmits the GTP Header 521 to the eNB 530.

Referring again to FIG. 3, after formatting the synchronized time information for transmission, the GW Bearer Tunneling Block 321 of the SGW 320 transmits the synchronized time information to the eNB 330. The synchronized time information is received by a Time Synchronization Controller 331 of the eNB 330. Upon receipt of the synchronized time information, the Time Synchronization Controller 331 provides the information to a QoS Scheduler 333. In an exemplary implementation, the Time Synchronization Controller 331 provides starting time information, which was determined by the Time Synchronization Controller 311 of the PGW 330, and provides time of arrival information to the QoS Scheduler 333. Using the starting time and the time of arrival information, the QoS Scheduler 333 can determine a delay time between the PGW 310 and the eNB 330. The Time Synchronization Controller 331 of the eNB 330 may use any of the three exemplary methods for determining the synchronized time information as discussed above.

Figure 6:
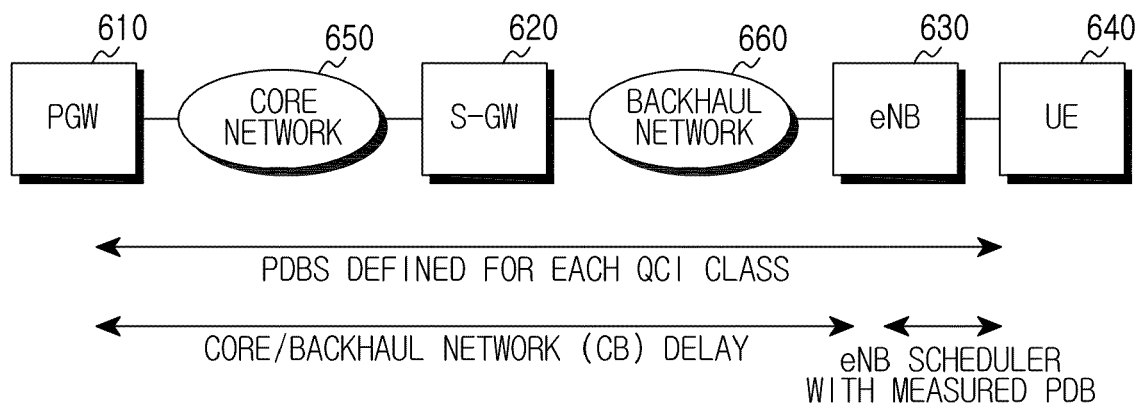
FIG. 6 is a block diagram illustrating a network delay as determined according to an exemplary embodiment of the present invention.

FIG. 6 is a block diagram illustrating a network delay as determined according to an exemplary embodiment of the present invention.

Referring to FIG. 6, an LTE system includes a PGW 610, an SGW 620, an eNB 630, and a UE 640. The LTE system of FIG. 6 further includes a Core Network (CN) 650 between the PGW 610 and SGW 620 as well as a Backhaul Network (BN) 660 between the SGW 620 and the eNB 630. Using the above described process, the time for packet transmission from the PGW 610 to the eNB 630, in other words the delay caused by the Core Network 650 and Backhaul Network 660 or, cumulatively, the CB delay, can be determined. More specifically, a CB time delay $CB_k(t)$ can be determined for each service k for frame t. According to an exemplary embodiment of the present invention, the CB time delay $CB_k(t)$ can be used in conjunction with the QoS Class Identifier (QCI) Packet Delay Budget (PDB) value $T_k$ as determined from Table 1 to provide for more accurate scheduling.

A measured PDB can be determined using Equation (4).

$$m_k(t) = T_k - CB_k(t) \quad \text{Eq. (4)}$$

In Equation (4), $m_k(t)$ is the measured PDB for service k provided to the eNB 630, $T_k$ is the QCI PDB for service k as listed in Table 1, and $CB_k(t)$ is the CB delay time as determined by an eNB scheduler using time synchronization information.

Using the measured PDB for service k (i.e., $m_k(t)$), the QoS scheduler of the eNB 630 can determine a more accurate scheduling metric. More specifically, the QoS scheduler can determine a more accurate scheduling metric using Equation (5).

$$S_k(t) = C\left(\frac{R_k(t)}{AvgR_k(t)}\right)\left(\frac{D_k(t)}{m_k(t)}\right) + O(P_k) \quad \text{Eq. (5)}$$

In Equation (5), t is a subframe number, $S_k(t)$ is the QoS scheduling metric for each SDF at subframe t, C is a constant, $R_k(t)$ is a channel capacity at t, Avg $R_k(t)$ is an average channel capacity at t, $D_k(t)$ is a packet delay for a non-Guaranteed Bit Rate (non-GBR) service at t or a token delay for a GBR service at t, $m_k(t)$ is the measured PDB of service k and $O(P_k)$ is an offset according to the priority of service k.

As can be seen in Equation (5) as compared to Equation (2), a more accurate scheduling metric can be determined by using the value of $m_k(t)$ in place of $T_k$. That is, since the value of $m_k(t)$ reflects the CB delay, the QoS scheduler of an eNB can more accurately allocate resources, and thus increase channel utilization.

Equation (6) reflects application of a smoothing technique on the measured PDB value $m_k(t)$.

$$\tilde{m}_k(t) = \Theta_m m_k(t) + (1-\Theta_m)m_k(t-1) \quad \text{Eq. (6)}$$

In Equation (6), t is a subframe number, $\tilde{m}_k(t)$ is an estimated PDB after application of a first order auto-regressive smoothing model, $\Theta_m$ is a scalar smoothing factor for measured PDB (wherein, $0 \leq \Theta_m \leq 1$), and $m_k(t)$ is the measured PDB for service k between an eNB and a PGW at subframe t. As illustrated in Equation (7), the smoothed value of the measured PDB $m_k(t)$ can also be used to determine a more accurate scheduling metric.

$$S_k(t) = C\left(\frac{R_k(t)}{AvgR_k(t)}\right)\left(\frac{D_k(t)}{\tilde{m}_k(t)}\right) + O(P_k) \quad \text{Eq. (7)}$$

In the above described exemplary embodiments of the present invention, an apparatus and method have been provided for determining a network delay using synchronized time information. Also, a more accurate scheduling metric has been introduced, based on the synchronized time information, which provides for improved scheduling of services to user terminals. Using the synchronized time information and more accurate scheduling metric, resources that otherwise would have gone unused may instead be used to provide service. Accordingly, network resource efficiency is increased.

It is to be understood that the above description of exemplary embodiments of the invention is made using reference to specific components found in an LTE system. However, this is not to be construed as limiting in that the invention, as defined by the appended claims and their equivalents, is applicable to any mobile communication system. Accordingly, it is to be understood that the above referenced terms such as PGW, SGW, and MME/GW may be replaced with a term such as server, the term eNB may be replaced with a term such as base station, and the term UE may be replaced with a term such as terminal or mobile equipment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a network delay in a base station of a mobile communication system, the method comprising:
   determining information about a first time at which data is transmitted from a node providing an interface to a Packet Data Network (PDN);
   determining information about a second time at which the data is received in the base station;
   determining a time delay occurring in a core network and a backhaul network using the first time and the second time; and
   scheduling a service based on the time delay.

2. The method of claim 1, wherein the information about the first time at which the data is transmitted comprises information that is synchronized with the information about the second time at which the data is received.

3. The method of claim 2, wherein the information about the first time at which the data is transmitted is synchronized with the information about the second time at which the data is received using at least one of a Global Positioning System (GPS), a Network Time Protocol (NTP), a Precision Timing Protocol (PTP), and a self-made time synchronization.

4. The method of claim 1, wherein the scheduling of the service comprises using the equation:

$$S_k(t) = C\left(\frac{R_k(t)}{AvgR_k(t)}\right)\left(\frac{D_k(t)}{m_k(t)}\right) + O(P_k)$$

wherein t is a subframe number, $S_k(t)$ is a scheduling metric for a service provided at the subframe t, C is a constant, $R_k(t)$ is a channel capacity at the subframe t, Avg $R_k(t)$ is an average channel capacity at the subframe t, $D_k(t)$ is one of a packet delay for a non-Guaranteed Bit Rate (non-GBR) service at the subframe t and a token delay for a GBR service at the subframe t, $m_k(t)$ is a measured Packet Delay Budget (PDB) of service k at the subframe t, and $O(P_k)$ is an offset according to the priority of service k.

5. The method of claim 4, wherein $m_k(t)$ is determined using the equation:

$$m_k(t) = T_k - CB_k(t)$$

wherein $T_k$ is a default PDB and $CB_k(t)$ is the time delay.

6. The method of claim 5, further comprising applying a smoothing technique to $m_k(t)$ using equation:

$$\tilde{m}_k(t) = \Theta_m m_k(t) + (1-\Theta_m)m_k(t-1)$$

wherein, $\tilde{m}_k(t)$ is an estimated PDB after application of a first order auto-regressive smoothing model, and $\Theta_m$ is a scalar smoothing factor for measured PDB, wherein $0 \leq \Theta_m \leq 1$.

7. The method of claim 1, wherein the determining of information about the first time at which data is transmitted comprises receiving the information about the first time at which data is transmitted from a server.

8. The method of claim 7, wherein the receiving of the information comprises receiving a General Packet Radio Service (GPRS) Tunneling Protocol (GTP) extension header containing the information about the first time at which data is transmitted.

9. An apparatus at a base station for scheduling a service based on a network delay, the apparatus comprising:
a time synchronization controller for determining information about a first time at which data is transmitted from a node providing an interface to a Packet Data Network, and for determining information about a second time at which the data is received in the base station; and
a scheduler for determining a time delay occurring in a core network and a backhaul network using the first time and the second time, and for scheduling a service based on the time delay.

10. The apparatus of claim 9, wherein the information about the first time at which the data is transmitted comprises information that is synchronized with the information about the second time at which the data is received.

11. The apparatus of claim 10, wherein the information about the first time at which the data is transmitted is synchronized with the information about the second time at which the data is received using at least one of a Global Positioning System (GPS), a Network Time Protocol (NTP), a Precision Timing Protocol (PTP), and a self-made time synchronization.

12. The apparatus of claim 9, wherein the scheduler schedules the service using the equation:

$$S_k(t) = C\left(\frac{R_k(t)}{AvgR_k(t)}\right)\left(\frac{D_k(t)}{m_k(t)}\right) + O(P_k)$$

wherein t is a subframe number, $S_k(t)$ is a scheduling metric for a service provided at the subframe t, C is a constant, $R_k(t)$ is a channel capacity at the subframe t, Avg $R_k(t)$ is an average channel capacity at the subframe t, $D_k(t)$ is one of a packet delay for a non-Guaranteed Bit Rate (non-GBR) service at the subframe t and a token delay for a GBR service at the subframe t, $m_k(t)$ is a measured Packet Delay Budget (PDB) of service k at the subframe t, and $O(P_k)$ is an offset according to the priority of service k.

13. The apparatus of claim 12, wherein $m_k(t)$ is determined using the equation:

$$m_k(t) = T_k - CB_k(t)$$

wherein $T_k$ is a default PDB and $CB_k(t)$ is the time delay.

14. The apparatus of claim 13, wherein the scheduler applies a smoothing technique to $m_k(t)$ using equation:

$$\tilde{m}_k(t) = \Theta_m m_k(t) + (1 - \Theta_m) m_k(t-1)$$

wherein, $\tilde{m}_k(t)$ is an estimated PDB after application of a first order auto-regressive smoothing model, and $\Theta_m$ is a scalar smoothing factor for measured PDB, wherein $0 \leq \Theta_m \leq 1$.

15. The apparatus of claim 9, wherein the time synchronization controller determines information about the first time at which data is transmitted by receiving the information about the first time at which data is transmitted from a service provider.

16. The apparatus of claim 15, wherein the time synchronization controller receives the information through a General Packet Radio Service (GPRS) Tunneling Protocol (GTP) extension header containing the information about the first time at which data is transmitted.

17. A mobile communication system for scheduling a service, the system comprising:
a server for determining information about a first time at which data is transmitted from a node providing an interface to a Packet Data Network (PDN); and
a base station for determining information about a second time at which the data is received in the base station, for determining a time delay occurring in a core network and a backhaul network using the first time and the second time, and for scheduling a service based on the time delay.

18. The system of claim 17 wherein the information about the first time at which data is transmitted comprises information that is synchronized with the information about the second time at which the data is received.

19. The system of claim 18, wherein the information about the first time at which the data is transmitted is synchronized with the information about the second time at which the data is received using at least one of a Global Positioning System (GPS), a Network Time Protocol (NTP), a Precision Timing Protocol (PTP), and a self-made time synchronization.

20. The system of claim 17, wherein the base station schedules the service using the equation:

$$S_k(t) = C\left(\frac{R_k(t)}{AvgR_k(t)}\right)\left(\frac{D_k(t)}{m_k(t)}\right) + O(P_k)$$

wherein t is a subframe number, $S_k(t)$ is a scheduling metric for a service provided at the subframe t, C is a constant, $R_k(t)$ is a channel capacity at the subframe t, Avg $R_k(t)$ is an average channel capacity at the subframe t, $D_k(t)$ is one of a packet delay for a non-Guaranteed Bit Rate (non-GBR) service at the subframe t and a token delay for a GBR service at the subframe t, $m_k(t)$ is a measured Packet Delay Budget (PDB) of service k at the subframe t, and $O(P_k)$ is an offset according to the priority of service k.

21. The system of claim 20, wherein $m_k(t)$ is determined using the equation:

$$m_k(t) = T_k - CB_k(t)$$

wherein $T_k$ is a default PDB and $CB_k(t)$ is the time delay.

22. The system of claim 21, wherein the base station applies a smoothing technique to $m_k(t)$ using equation:

$$\tilde{m}_k(t) = \Theta_m m_k(t) + (1 - \Theta_m) m_k(t-1)$$

wherein, $\tilde{m}_k(t)$ is an estimated PDB after application of a first order auto-regressive smoothing model, and $\Theta_m$ is a scalar smoothing factor for measured PDB, wherein $0 \leq \Theta_m \leq 1$.

23. The system of claim 17, wherein the server transmits the information about the first time at which data is transmitted to the base station using a first General Packet Radio Service (GPRS) Tunneling Protocol (GTP) extension header containing the information about the first time at which data is transmitted.

24. The system of claim 23, further comprising an intermediate server for receiving the first GTP extension header from the server, for cutting and pasting the information about the first time at which data is transmitted from the first GTP extension header into a second GTP extension header, and for transmitting the second GTP extension header to the base station.

* * * * *